(12) United States Patent
Reinhard

(10) Patent No.: US 6,419,622 B1
(45) Date of Patent: Jul. 16, 2002

(54) ACCELERATION PROTECTIVE SUIT

(75) Inventor: Andreas Reinhard, Zollikon (CH)

(73) Assignee: LSS Life Support Systems AG, Zolliken (CH)

( * ) Notice: Subject to any disclaimer, the term of this patent is extended or adjusted under 35 U.S.C. 154(b) by 0 days.

(21) Appl. No.: 09/446,440

(22) PCT Filed: Apr. 23, 1998

(86) PCT No.: PCT/CH98/00160

§ 371 (c)(1),
(2), (4) Date: Apr. 18, 2000

(87) PCT Pub. No.: WO99/54200

PCT Pub. Date: Oct. 28, 1999

(30) Foreign Application Priority Data

Apr. 20, 1998 (CH) .................................. 900/98

(51) Int. Cl.[7] .............................. B64D 10/00; B64G 6/00
(52) U.S. Cl. ........................................................ 600/20
(58) Field of Search ................................... 600/19–20

(56) References Cited

U.S. PATENT DOCUMENTS 2,228,115 A  1/1941  Holste .......................... 600/20
3,523,301 A  8/1970  Davis et al. .................. 200/21

FOREIGN PATENT DOCUMENTS

| GB | 959 350 | 5/1964 |
|---|---|---|
| WO | WO 9103278 | 3/1991 |

*Primary Examiner*—John P. Lacyk
(74) *Attorney, Agent, or Firm*—Jenkens & Gilchrist, A Professional Corporation

(57) ABSTRACT

The suit according to the invention comprises, as well as a textile lining and an oversuit, an active part lying between them. This is at least partly made from a layer (3) on the body side and a layer (4) away from it, both of a fluid-tight, low stretch textile material, which are connected to each other at connection positions (6) by gluing, welding or sewing and thereby create hollow spaces (5), which are filled with fluid through valves (16, 17). Between regions, which comprise the layers (3, 4), for instance the upper part (14) and the front part (15), joining parts can be arranged, which transmit tensile forces only. This builds up a compensating pressure proportional to the acceleration working in the momentary and local direction on the parts of the body lying beneath and thus takes the load off the organism of the pilot arising from the effects of such accelerations. The suit is closed by zip fasteners (11, 12, 13), matched to the current bodily conditions of the wearer by velcro fasteners and tensioned by zip fasteners or a hydraulic tensioning device.

59 Claims, 9 Drawing Sheets

Figure 1:
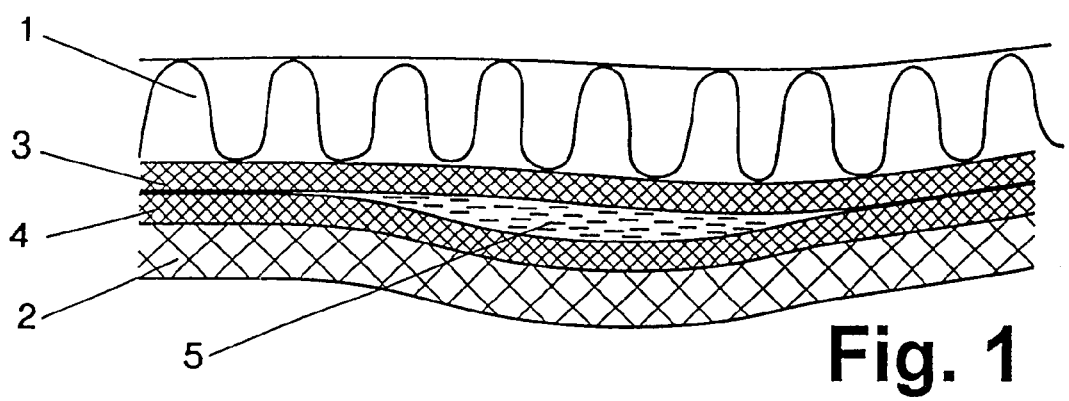

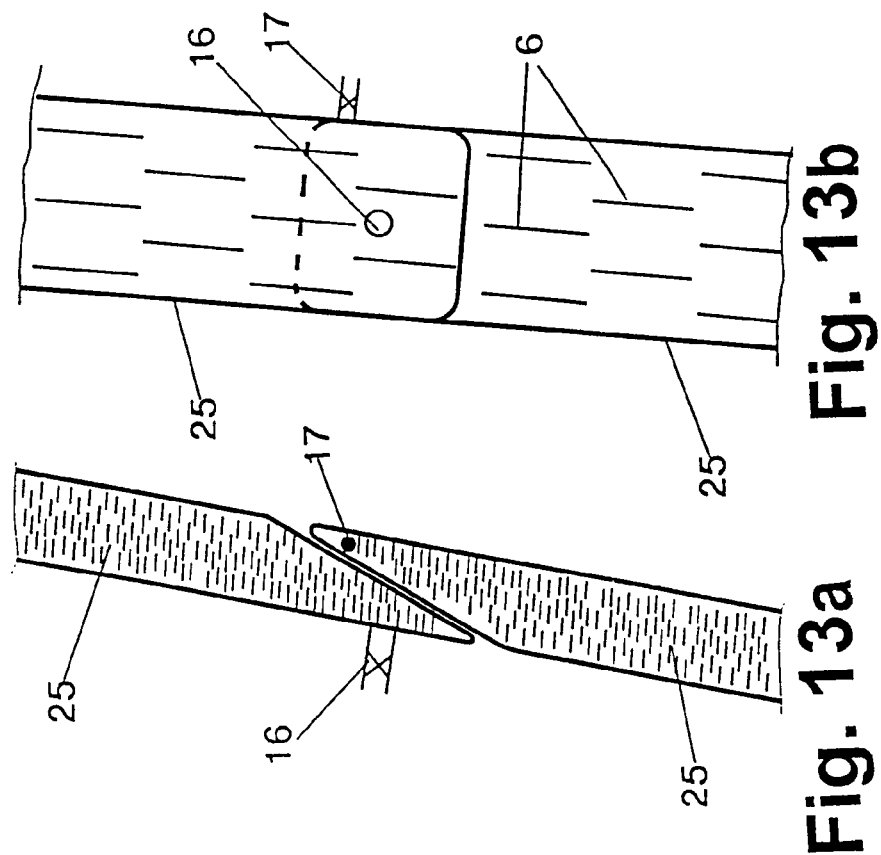
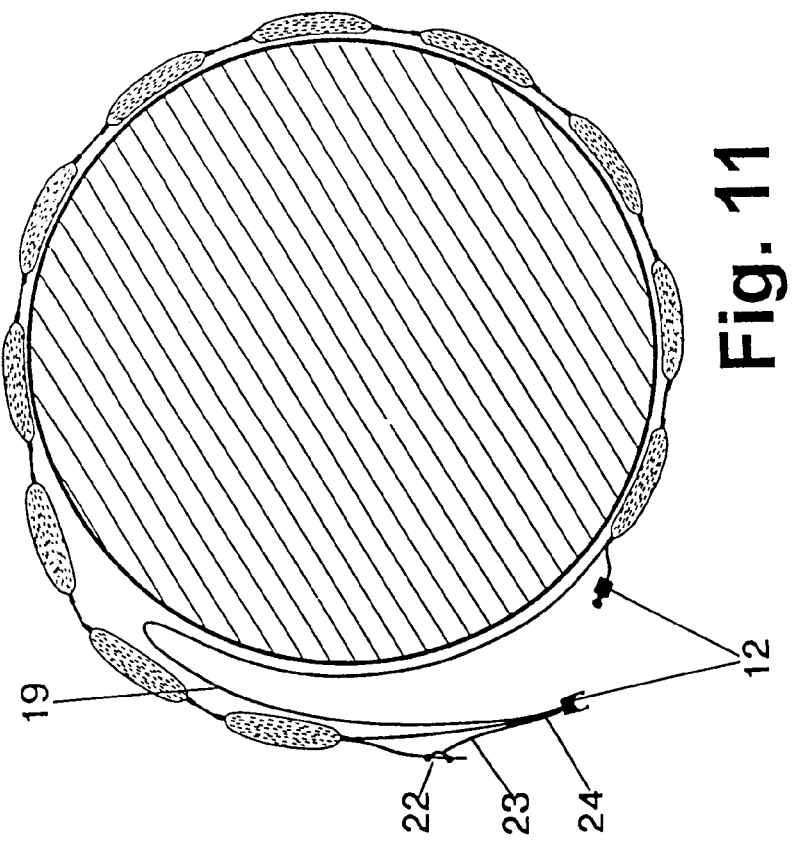

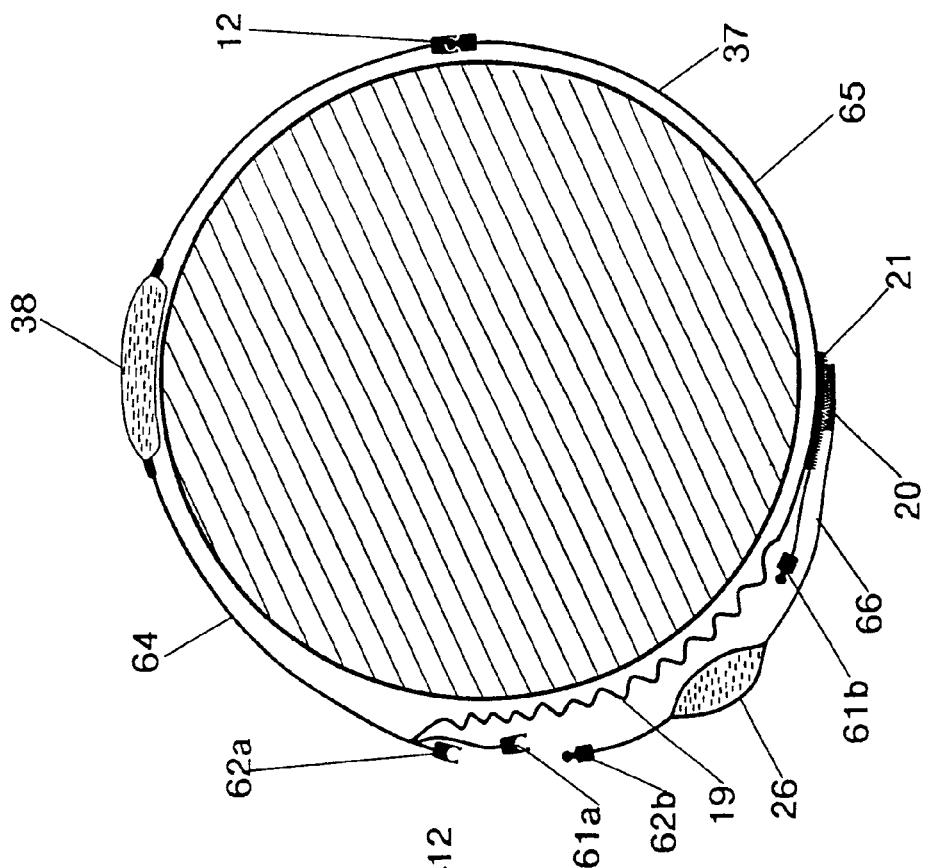
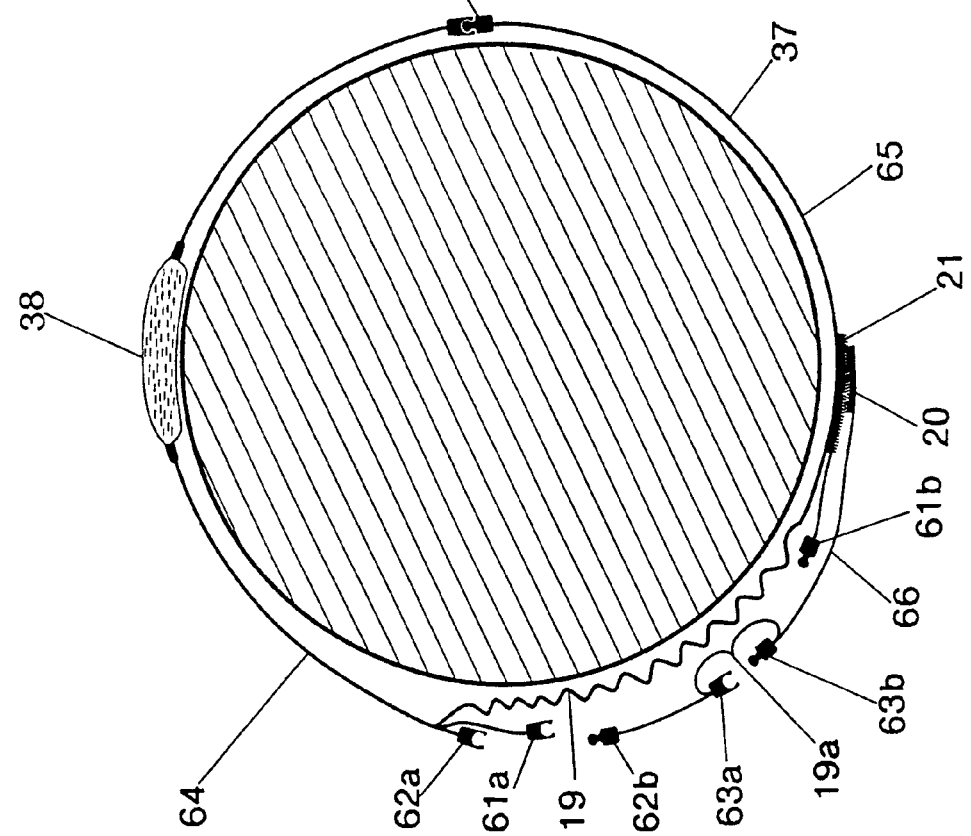
Fig. 15
Fig. 14

ACCELERATION PROTECTIVE SUIT

The present invention relates to a suit for protection against the effects of acceleration, such as arise in high performance aircraft when flying in curves, in accordance with the preamble to claim 1.

Many such protective suits have become known. Those nearest to this invention work on the pressure principle: the body of the pilot—or in the case of multi-seat aircraft naturally the other flying personnel also—is surrounded by a liquid-carrying double layer. The acceleration forces operating on the body's own fluids, predominantly the blood, affect the liquid present in the protective suit in equal measure. Thereby pressure forces are built up on the surface of the body, which correspond to those, which work on the skin from the body fluid. Such a suit is known from EP 0 376 027 B1 D1, which converts the pure pressure principle. This known conversion from D1 requires a relatively large volume of liquid, which is held together on the outside by a low elasticity suit. Although the pilot's body is now released from the pressures on blood vessels, internal organs and skin, on the other hand his body—the skeleton and static musculature—is additionally loaded to a substantial degree by the weight, multiplied by the acceleration factor, of the mass of water carried, which necessitates the application of a supporting corset to remove the loading on the spinal column. Furthermore the application of the protective suit according to D1 has the consequence that the pilot cannot climb into nor leave the aircraft without outside help. The water or general fluid filling can only take place in the aircraft. An emergency exit by means of an ejector seat is inconceivable. Dressing with this quoted protective suit also requires intensive outside assistance.

A further protective suit is known from U.S. Pat. No. 5,153,938 (D2), which essentially builds on the pressure principle.

An inner suit, which however leaves large parts of the body uncovered, comprises liquid filled flat bladders. An outer suit, to be worn over it, is essentially inelastic and holds the whole ensemble together. The pressure built up by the bladders is transmitted by the outer suit to the parts of the body unprotected by the inner suit.

Although here by dispensing with the covering of the whole body by the inner suit substantial fluid—and therewith mass and weight—can be saved, the suit claimed in D2 is still heavy. In order to reduce the weight further and to improve freedom of movement, in D2 pressure compensation on the arms is completely dispensed with. It is replaced by elastic armlets; their compensating effect is only so far acceleration dependent, as the volumes of the arms increase with the additional acceleration forces on the blood, and thereby the elastic material of the armlets is additionally tensioned.

A further protective suit on the pure pressure principle is known from CH 687 573 (D3), which however is made in one part, in so far as the unyielding outer skin forms the outer suit. Here also a disadvantage exists in the high weight of the protective suit.

The aim, which is to be addressed by the present invention, comprises the production of a suit for protection against the effects of the acceleration forces, which arise in curved flight in high performance aircraft, predominantly in the instantaneous and local Z-axis, furthermore the protective suit to be produced should be lighter than those previously known, should make it possible that it can be put on and taken off by the wearer without help and enable him to climb into and leave the aircraft without help and permit the wearer generally to have normal mobility outside the aircraft.

The addressing of the stated aim is given in claim 1 with respect to its essential features, in the further Claims with respect to further advantageous developments.

The idea of the invention is more closely explained using the attached drawing. Shown are:

FIG. 1 a cross section through a build up of the layers of the protective suit,

FIG. 2

*a* plan view

*b* a first section

*c* a second section

Figure 3:
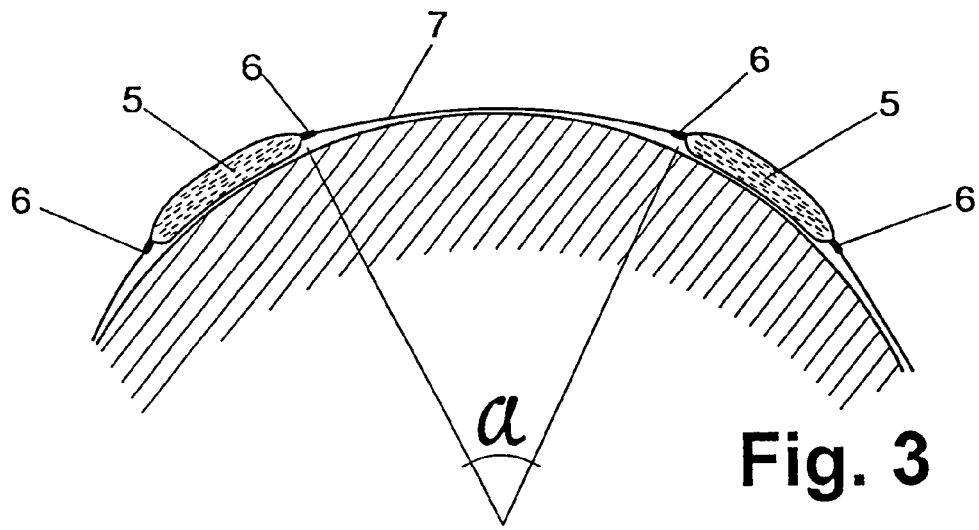

*d* a third section through a first arrangement of connection positions,

FIG. 3 a section through a second arrangement of connection positions,

FIG. 4

*a* plan view,

*b* a side elevation of a third arrangement of connection positions

Figure 9:
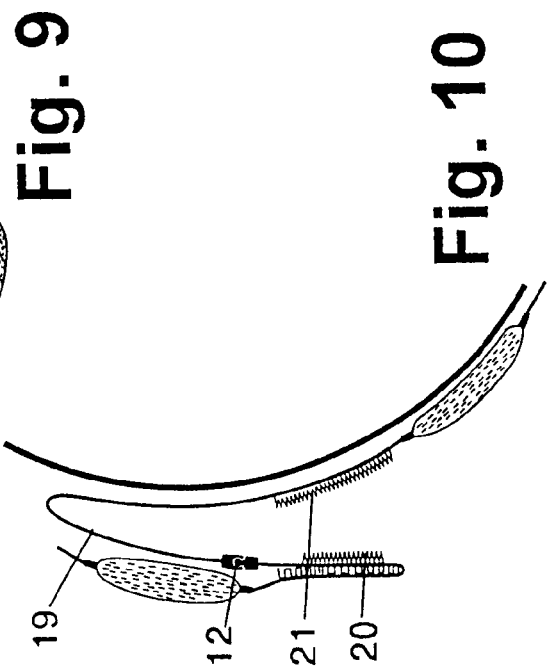
Figure 10:
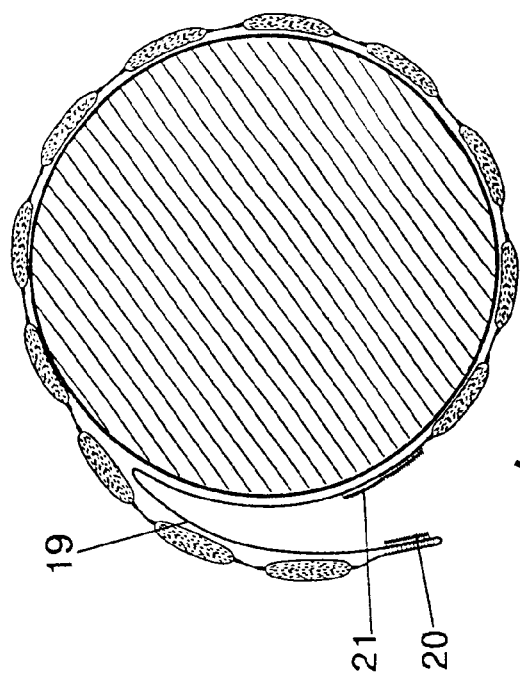
Figure 5:
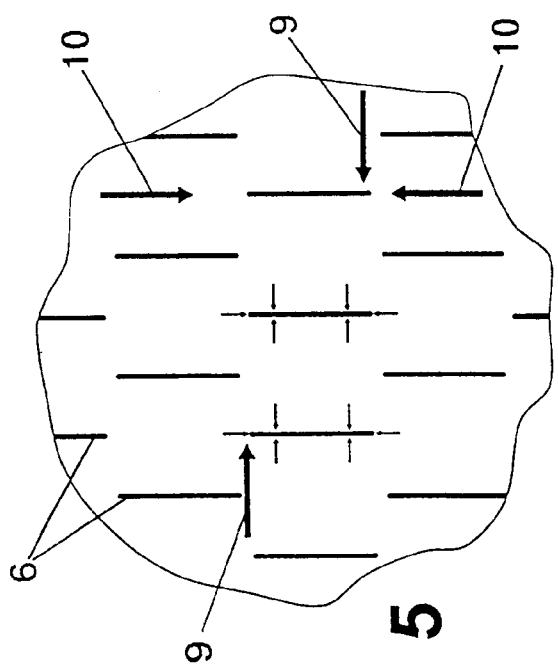
Figure 6:
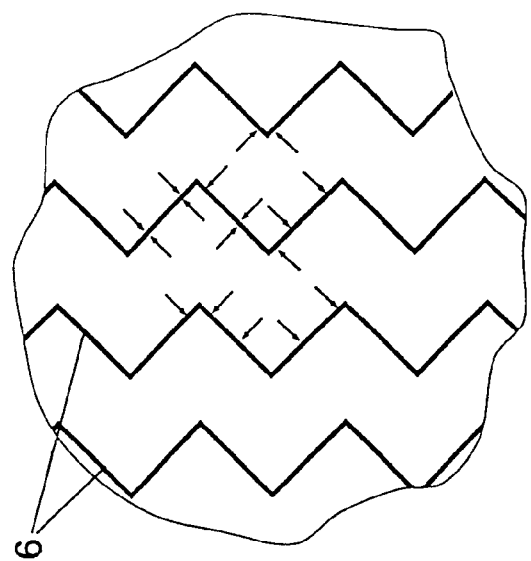
Figure 8:
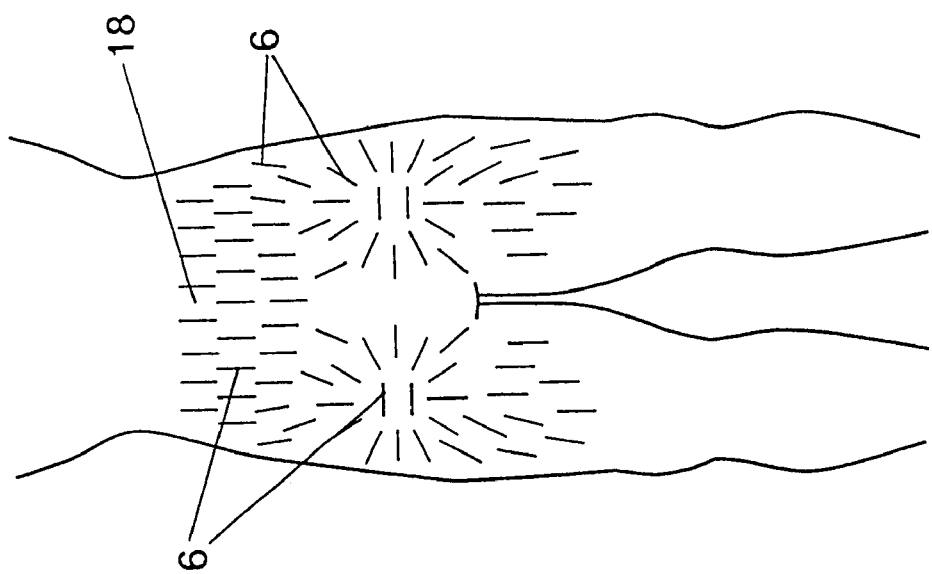
Figure 7:
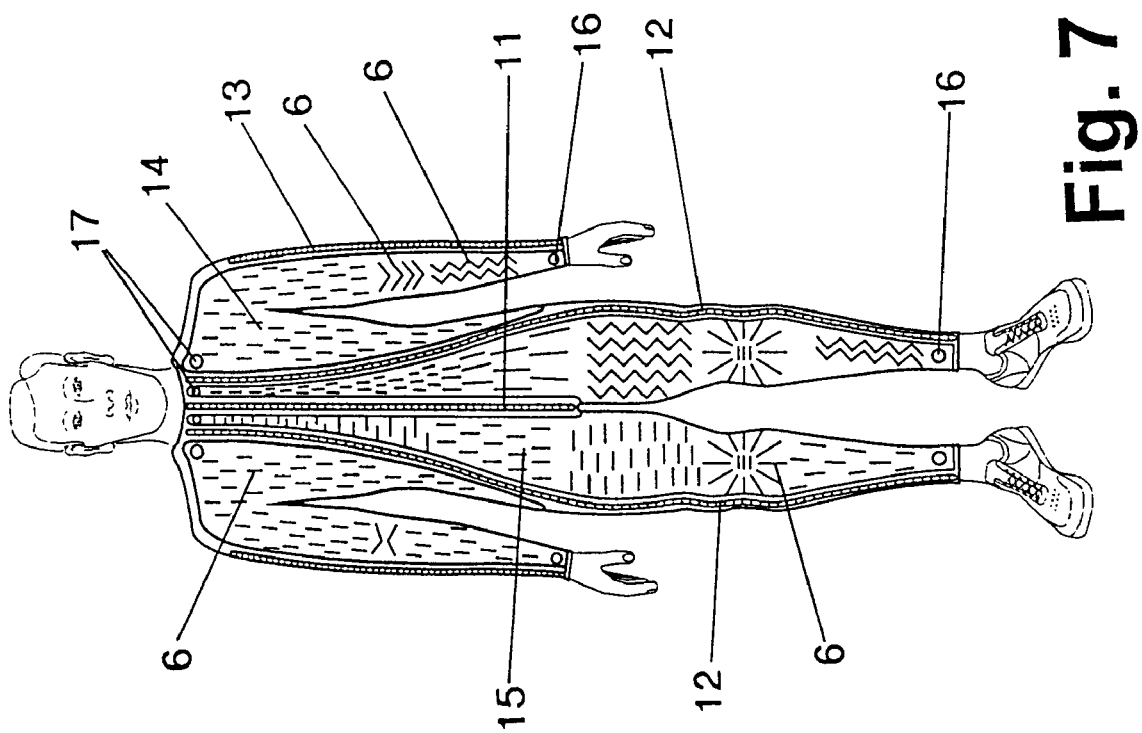
Figure 12:
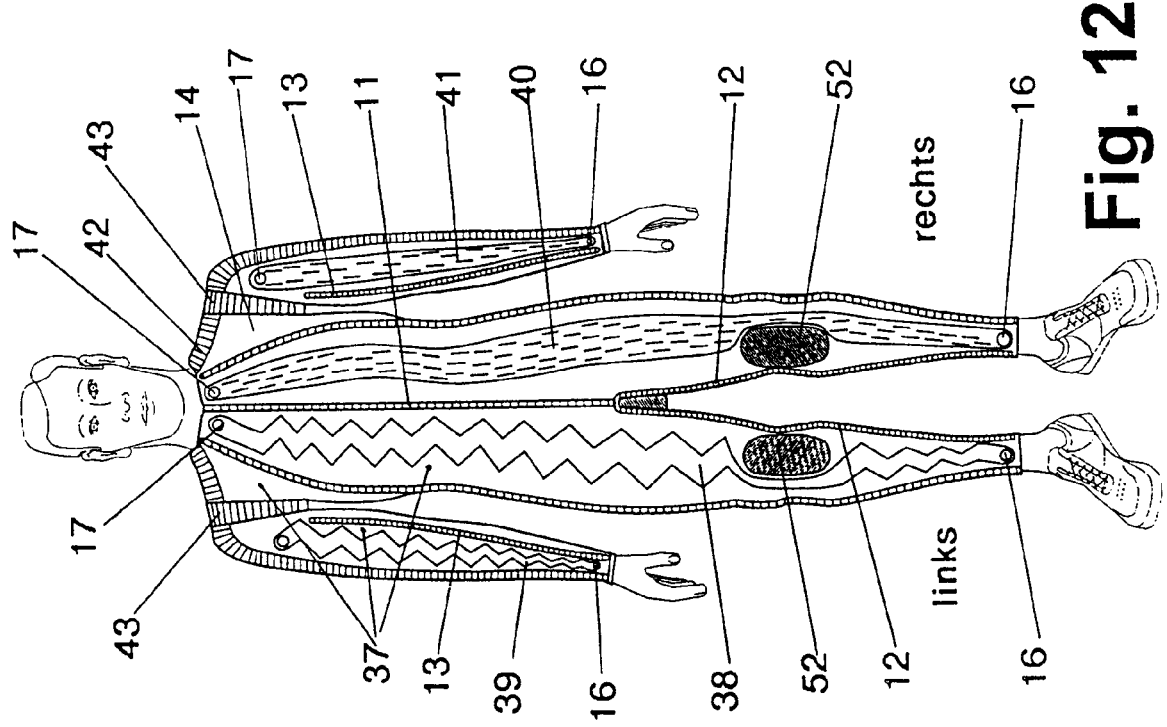

FIG. 5 a fourth arrangement of connection positions,

FIG. 6 a fifth arrangement of connection positions,,

FIG. 7 a front view of a first example of construction of the protective suit in two modifications, FIG. 8 a detail from the rear view of the first example of construction, FIG. 9 a cross section through a first example of construction of a closure device, FIG. 10 a cross section through a first modification of FIG. 9, FIG. 11 a cross section through a second modification of FIG. 9, FIG. 12 a front view of a second example of construction of the protective suit in two modifications,

FIG. 13

Figure 16:
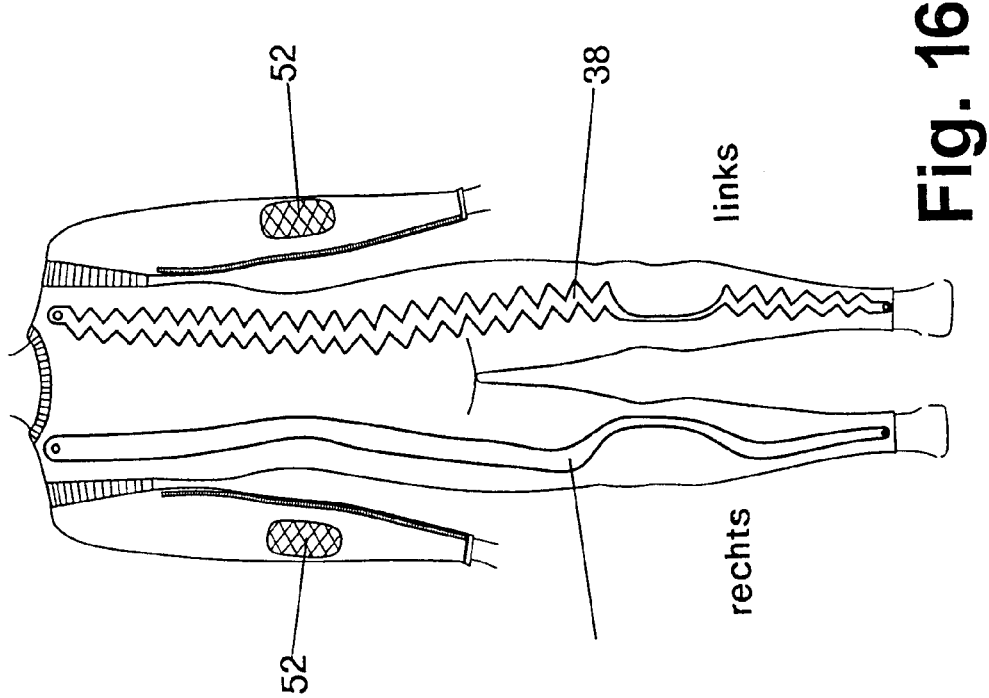
Figure 18:
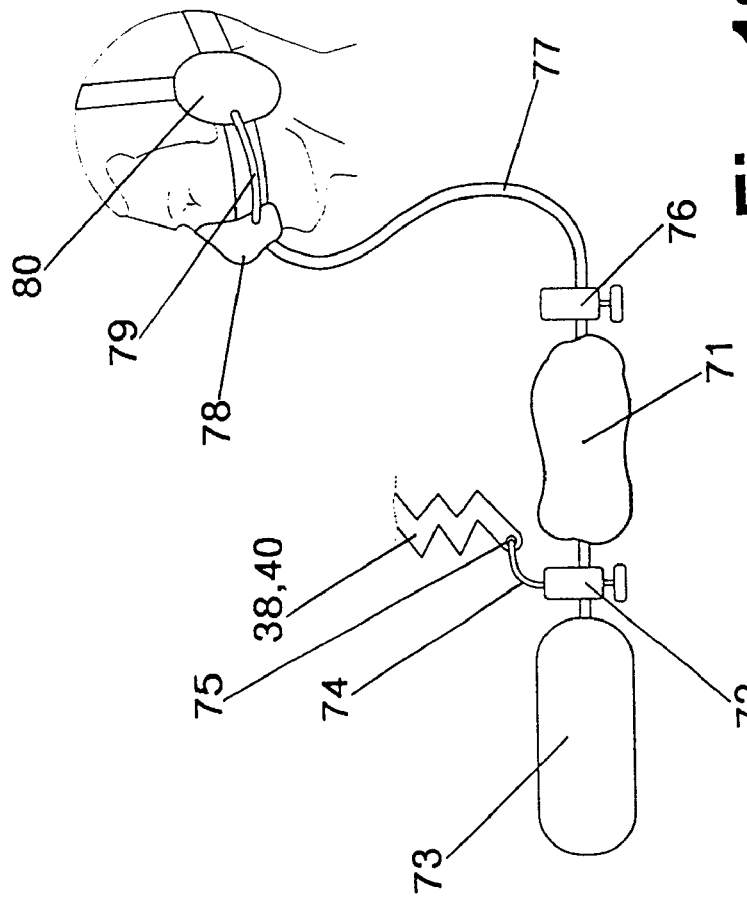
Figure 17:
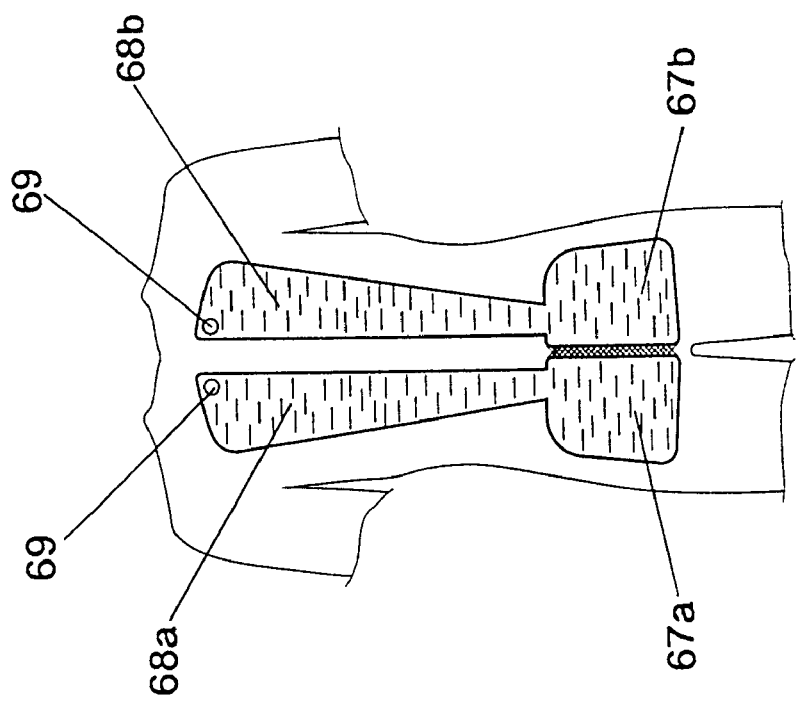
Figure 20:
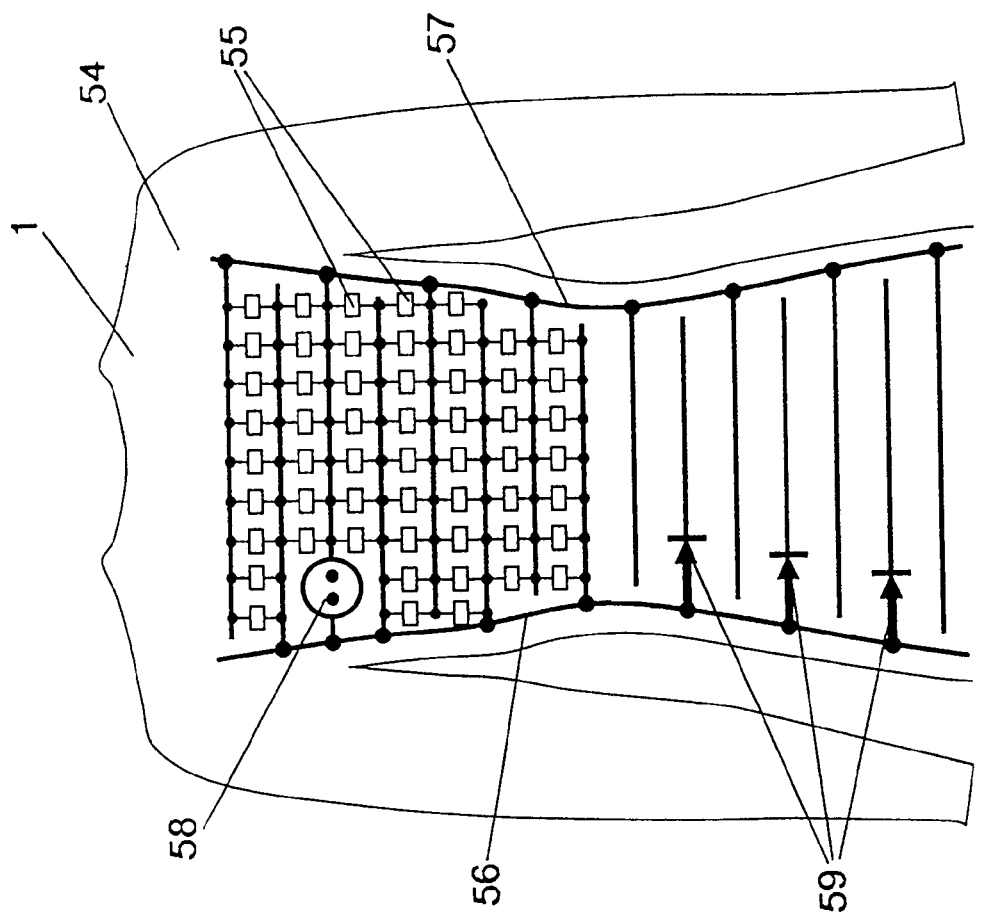
Figure 19:
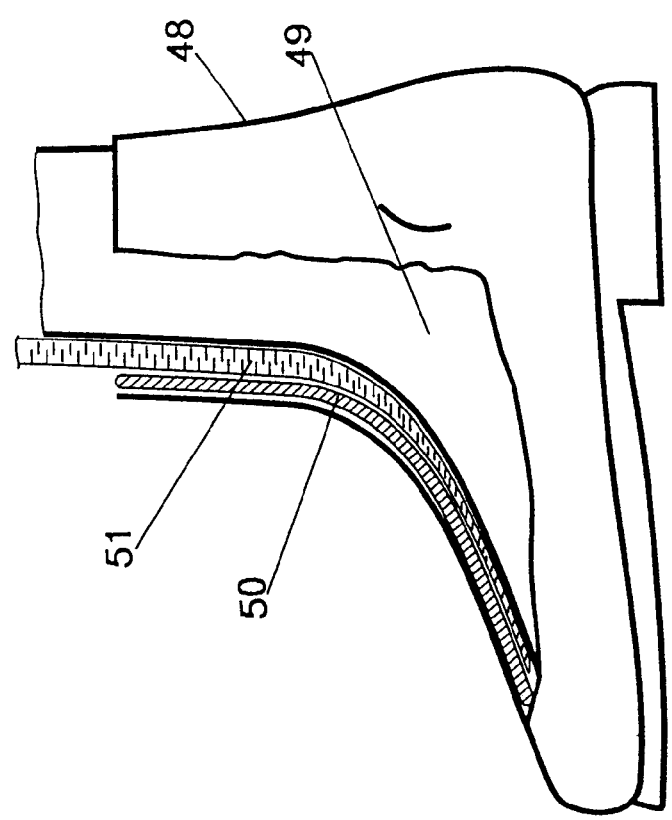

*a* a longitudinal section,

*b* a plan view of a modification of construction,

FIG. 14 a cross section through a second example of construction of a closure device, FIG. 15 a cross section through a third example of construction of a closure device FIG. 16 the rear view of FIG. 12, FIG. 17 a schematic plan view of an addition according to the invention, FIG. 18 the schematic representation of the pressure breathing system, FIG. 19 a partly sectioned side view of a detail, FIG. 20 a schematic representation of a heating and cooling arrangement of a protective suit.

The protective suit according to the invention basically comprises three pieces of clothing. The innermost comprises, as schematically shown in FIG. 1, a textile lining 1. The actual protective suit is worn over this. This is constructed from an inner layer 3 and an outer layer 4. The layer 3 comprises an armoured watertight plastics material, whereby the armouring comprises a low stretch fibre material such as aramid fibre. The layer 4 is made from the same material as layer 3 and connected to it at various positions. The connection of the layers 3 and 4 occurs for instance by welding, or sewing with a subsequent sealing of the stitching. Since the pattern arising from the connection of the layers 3, 4 is material to the invention, this is discussed separately below. Between the layers 3, 4 a fluid, for instance water, possibly with additives, which influence its fluidity and/or density, is present in the hollow spaces 5 arising from their connection. On the outer side of the layer 4, possibly joined to it over the whole surface or at various positions, there is a robust textile oversuit 2, onto which all the necessary and useful objects and devices for a pilot's suit are fastened.

Whilst of themselves the presence and shaping of the lining 1 and the oversuit 2 are well known, their connection to the ensemble of the layers 3, 4 to form a single item of clothing is part of the idea of the invention. Without departing from the core of the idea of the invention, the lining 1 and the oversuit 2 could also possibly be constructed as separate items of clothing. The active part of the protective suit according to the invention comprises the partially connected layers 3, 4.

Figure 2A:
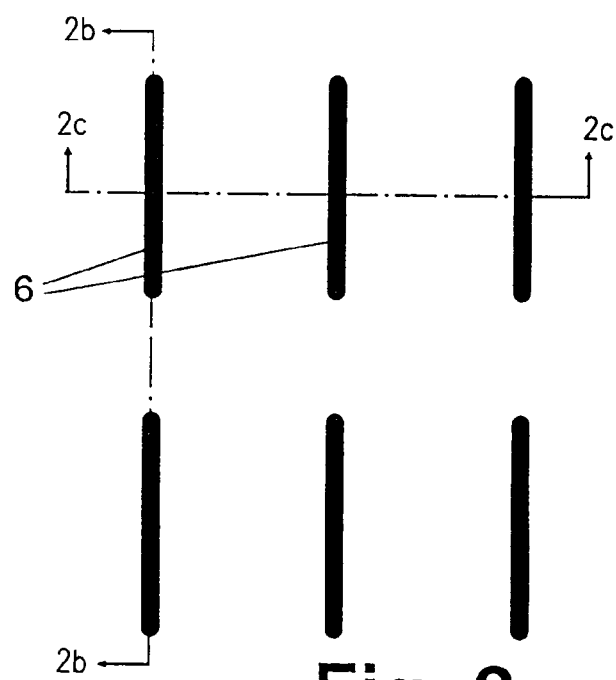
Figure 2B:
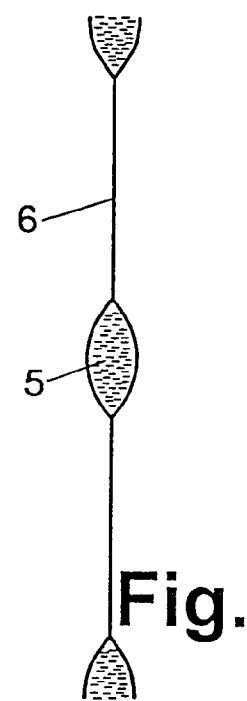
Figure 2C:
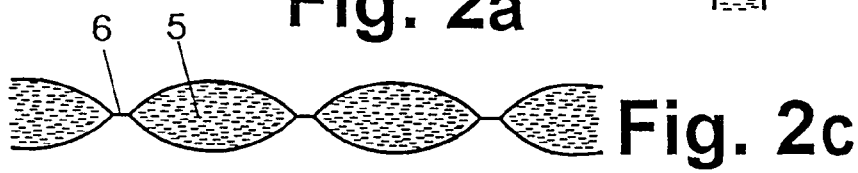

FIGS. 2a, b, c, d show in detail views the attachment of the connection positions 6 of the layers 3, 4. As already explained, these connection positions can be produced by welding, gluing or stitching. In FIG. 2a is shown a field of for instance six connection positions 6. Each individual connection position has the form of a long thin strip. A section 2b–2b according to FIG. 2b shows that the separation between the ends of the strip-shaped connection positions 6 is shortened, as soon as the fluid present in the hollow space 5 between the layers 3, 4 flows in and is put under pressure. The same applies for the lateral separation of the connection positions 6, as is shown in the section 2c–2c according to FIG. 2c.

Figure 2D:
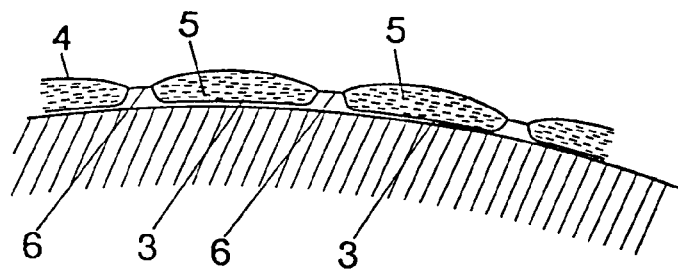

If now a structure formed from the layers 3, 4—the lining 1 and the oversuit 2 are omitted for the sake of clarity—is placed around a body part, for instance a thigh, then there arises, as is shown schematically in FIG. 2d:

The outer layer 4 is tensioned to a tension force σ, the inner layer lies—essentially tension-free—against the surface of the body; within the hollow space 5 a pressure p applies. This builds up the tension force σ which is transmitted via the connection positions 6, so that a certain pressure p corresponds to a certain tension force.

If now two—shown in the section—hollow spaces 5 are arranged such that a separation zone 7 lies between them, which contains no hollow spaces 5, then the tensile force σ is propagated essentially without degradation from hollow space 5 to hollow space 5. The degradation of the tensile force, which normally proceeds with a radially included angle α:

$$\sigma(\alpha) = \sigma_0 \cdot e^{-\alpha \cdot f_H}$$

where
  $\sigma_0$ = initial tension
  $f_H$ = coefficient of static friction applies only for rigid enclosed bodies. Human body tissue is however largely compliant and deformable.

The separation zone 7 can comprise the layers 3, 4 lying on top of each other, or rather a flexible but nevertheless low stretch textile material, for instance the layer 3 or the layer 4 only. The connection points 6 are immediately adjacent to the hollow spaces. They can, as shown in FIGS. 1, 2, connect the layers 3, 4, or additionally ensure the connection to the textile material, from which the separation zone 7 is produced.

Figure 4A:
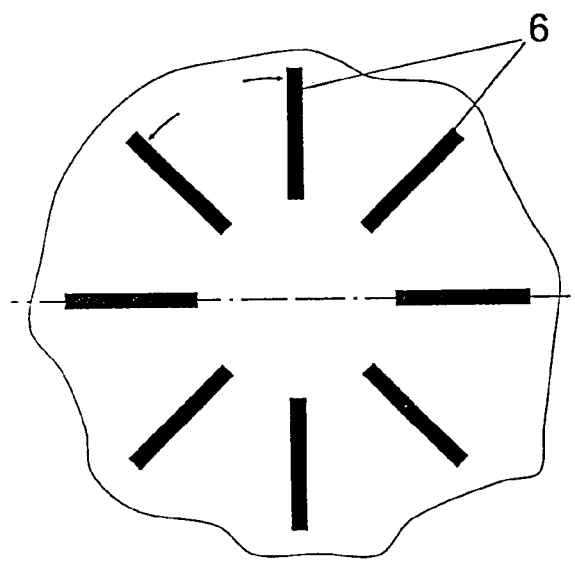
Figure 4B:
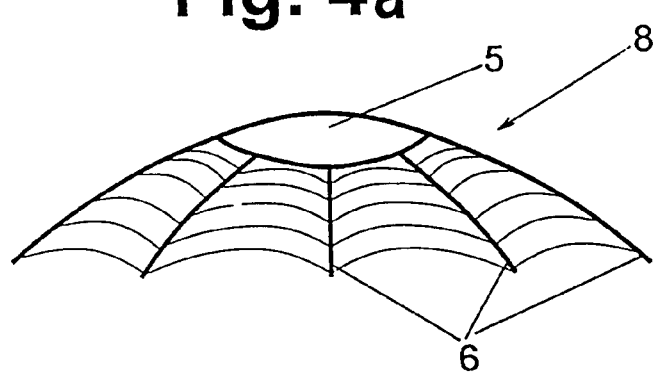

FIGS. 4a, b show the deformation effected by pressure in an arrangement of for instance eight radially applied connection positions 6. In FIG. 4a a plan view is shown, in FIG. 4b a side elevation, partly in section. Since the intervening spaces between the connection positions 6 shorten almost proportionately to the distance between homological points of two connection positions, the arrangement lifts from the level in the shape of a barrel and forms a basket 8.

Such an arrangement is preferably selected at points on the body, where curves have to be enclosed, such as elbows, knees, seat; arrangements according to FIG. 2 are preferably to be selected for more cylindrical or flat parts of the body. Modifications to the arrangement of FIG. 2 are presented in FIGS. 5 and 6.

In FIG. 5 the linearly constructed connection positions are arranged in rows displaced from each other. By the application of pressure on the fluid, which is present in the hollow spaces 5 arising between the layers 3, 4, force effects arise on the connection positions 6 (small arrows in FIG. 5). Due to this the existing construction of the layers 3, 4 shortens, preferably in the direction at right angles to the linear connection positions 6 (large arrows 9 in FIG. 5). To a smaller degree, however, there arises from this arrangement a similar shortening in the direction of the linear connection positions 6 (large arrows 10). The tensile forces σ arising therefrom are thus related in the same order, so that $\sigma_{across} > \sigma_{longitudinal}$. The fluid present between the layers 3, 4 has great mobility in this arrangement; it can flow both along as well as at right angles to the direction of the linear connection positions 6.

The arrangement according to FIG. 6 builds up, in contrast to that of FIG. 5, almost isotropic tensile forces, since due to the zig-zag pattern of the connection positions 6 the projections in both coordinate directions in the plane of the layers 3, 4 are almost exactly great, or at least can be exactly great. Thereby an almost isotropic shrinkage of the sizes of the surface areas provided with connection positions 6 can be attained. Instead of the depicted zig-zag pattern with sharp corners a formation with curves is also included in the idea of the invention; instead of a zig-zag pattern in the narrow sense, then, a wave-shaped one arises. All such configurations are included and are to be understood within this concept.

The mobility of the fluid in the hollow spaces 5 between the connection positions 6 according to FIG. 6 is restricted insofar as it is not possible at right angles to the connection positions 6.

FIG. 7 shows the protective suit according to the invention in a first example of construction with modifications with regard to the arrangement of the connection positions 6. In this representation also, the oversuit 2 is omitted. The layers 3, 4 are, as already mentioned, made from essentially non-stretch material. This fact and the requirement on the suit according to the invention, that it lies tightly on the body of the wearer, demands that the suit fulfils this requirement in the sitting position of the wearer. This means—at least for the example of construction shown in FIG. 7—that the protective suit is cut for each wearer individually. In order to retain the mobility of the wearer until he takes up the sitting position, the example of construction according to FIG. 7 has several zip fasteners 11, 12, 13. The zip fastener 11 runs over the breast and abdomen, opens the protective suit from neck to groin. The two zip fasteners 12 run from the neck over the hips and then to the sides over the thighs and lower legs to the ankles. The two zip fasteners 13 begin at the shoulders and run to the sides over the arms down to the hands. In the example of construction shown, the hands and feet are left uncovered by the protective suit. The protective suit can be put on and partly closed by the zip fasteners 11, 12, 13; definitive closure then follows in the aircraft in the sitting position.

The arrangement of the connection positions 6 represented in FIG. 7 shows a different form of construction according to the invention on the left hand side of the wearer than on the right. In the sense of the configurations in FIGS. 2 to 6 all the arrangements are in accordance with the invention, which due to the shortening of the basic material comprising the layers 3, 4 have the effect that a compensatory pressure is built up from outside onto the body surface corresponding to the internal pressure, or that a tensile force σ arises, which immediately causes the outside force mentioned. It is essential to this arrangement that the flow of fluid can occur unhindered, primarily from top to bottom, but also from left to right. Obviously the zip fasteners 11, 12, 13 restrict this cross flow, however not to a decisive degree. Immediately adjacent to each half of each of the zip fasteners 11 to 13 there runs in each case a connection position 6 over their entire length; thereby the zip fasteners 11 to 13 transmit tensile forces, but have however no contact of any sort with the fluid contained in the hollow spaces 5. The protective suit according to FIG. 7 is divided into five independent parts by the arrangement of the zip fasteners: back part (not visible in FIG. 7), left and right upper parts 14, left and right front part 15. For the filling process with the fluid flowing into the hollow spaces 5 and then being held there, each of the parts 14, 15 and the back part has at least two valves 16, 17, whereby the valves 16 are arranged respectively at the lower ends, the valves 17 respectively at the upper end of each part. Obviously the hollow spaces 5 can be filled once for all time. The filling and in all cases the ventilation positions are sealed following the filling process. Thereby all the valves 16, 17 quoted become redundant.

In FIG. 8 the seat part of the back part designated with the reference 18 is shown. In the upper part the connection positions run essentially vertical; the main tension direction runs horizontal and causes an outside pressure on the organs in the abdominal cavity. Their volume is thereby restricted; the blood cannot collect there. This arrangement shown in the back is continued also at the front (FIG. 7). The seat is covered by structures in accordance with FIG. 4, so that each half of the seat is enclosed for itself under pressure from a hollow shape as shown there.

A zone is connected under this in which the thighs especially are under a pressure working along the circumference of a hollow shape shown there.

FIG. 9 is a sectional representation of a second example of construction of a protective suit. The part at least of the zip fasteners 12 running the length of the legs is here dispensed with. This example of construction has for this an insert 19. For the closure of the part of the protective suit shown this insert which is made without hollow spaces 56 or connection positions 6, but which can comprise both layers 3, 4 is tucked in. For closure a velcro fastener 20 is provided, whose part 21 lying on the body is made wider than its counterpart. With this the suit can be matched to the current condition of the wearer; possibly an extensive making to measure can be avoided for such a protective suit. Although depicted for the leg—thigh and lower leg—the constructions according to FIG. 9 apply also to the arms and the upper body down to and including the belly and abdominal region. Instead of a velcro fastener 20 a closure with adjustable straps can also be provided, in combination with a zip fastener, as shown in FIG. 11. Instead of a continuous velcro fastener 20, it is possible also under the invention to distribute a multiplicity of textile laces, of which each is equipped as a velcro fastener 20 and closes with the continuous part 21, lying against the body.

The detailed representation of FIG. 10 has—supplementary to that of FIG. 9—a zip fastener 12. With this the suit can from time to time be completely opened, as shown in FIG. 7; the matching to the conditions of the wearer occurs, as shown according to FIG. 9, via the velcro fastener 20, 21.

In the example of construction according to FIG. 11 the matching occurs by means of straps 23 and buckles 22, of which a multiplicity is present over the whole length of the suit. The straps 23 are fastened to a strengthened part 24 of the protective suit. To this, one part of the zip fastener 12 is fastened, whose other part is fastened to the part of the protective suit which is not tucked in. The resolution of the continuous velcro fastener into a multiplicity of laces is also a modification within the sense of the invention.

A third example of construction of the protective suit is shown in FIG. 12. This figure is divided into a left hand side and a right hand side half picture, of which each shows a modification of the example of construction. Common to both modifications is that the main part of the suit or its active part, apart from the lining 1 and the oversuit 2, are made from a low stretch, but air and vapour permeable textile material. This main part carries the reference number 37. Over the whole length of the protective suit a wave-shaped band 38 runs on the left in FIG. 12, a similar one over the whole armlet on the left, with the reference number 39. The bands 38, 39 comprise the layers 3, 4, which are welded glued or sewn in the manner already depicted. The connections of the main part 37 with the wave-shaped bands 38, 39 are effected by sewing and/or welding or gluing. The pressure dependent and anisotropic shrinking of the bands 38, 39, which are each designed as a connecting hollow space 5, is sufficient to build up the necessary pressure over the textile material of the main part via its tensile force. Each band 38, 39 has again a lower valve 16 and an upper valve 17.

The modification on the right of FIG. 12 shows—as the single difference—an extended band 40 along the body, an extended band 41 along the armlet. Both bands 40, 41 carry a pattern of connection positions 6 according to FIG. 5, which similarly effects an anisotropic shrinking. Both shoulder parts 42 of the protective suit, as also the connections 43 of the upper part 14 to the armlets are here made of elastic textile materials, which increases the mobility of the wearer.

In those places where in the sitting position of the wearer there are knees and elbows in the protective suit, it has according to FIG. 12 in each case an elastic insert 52. Not shown, but nevertheless included in the sense of the invention, there are branching bands 38 to 41 to above and/or below. Thereby the course of the tension and the matching to the anatomy of the wearer can be optimised. Both in the configuration according to FIG. 7, and also in that according to FIG. 12 or FIG. 16 it is in accordance with the invention that in places where, in the sitting position of the wearer, creased folds occur, for instance in the elbow bends and the groin region, elastic bending but non-kinking elements, for instance small tubes are inserted. Thereby the hydrostatic connection can be still better assured. The wave shaped bands 38, 39, 40, 41 can be divided into independent bands 25. This division is more closely explained below using FIG. 13.

FIG. 13 shows the division of bands 38 to 41, in accordance with the invention, FIG. 13a in cross section, FIG. 13b in a plan view. Although shown here for bands 40, the following description applies in similar manner for the other forms of construction. Band 40 is divided in its length into closed off part bands 25, which each has a lower and an upper valve 16, 17. The part bands 25 are arranged such that overlap over part of their length and are connected together at their connection positions 6 and edges. If now due to acceleration effects the pressure in the upper part band 25 rises, then this increase in pressure is transmitted to the lower part band 25. The advantage of this modification of the solution lies in increased security, since in the event of the destruction of a part band 25 only a partial failure of the whole arrangement occurs, which furthermore can be at least compensated for by the other bands 40, divided into part bands 25. Obviously this modification of the solution can be used in the example of construction according to FIG. 7. The overlapping positions have then simply to be made broader.

This example of construction in FIG. 12 is closed according to the presentation in FIG. 14. This presentation applies on the one hand for arms and legs in the same way, and on the other hand for the closure of the whole protective suit, as shown below. Arm and leg tubes are to be opened completely using the zip fasteners 12, as in accordance with FIG. 12. These are joined with the halves designated 64, 65 by the insert 19, which can comprise a thin textile material, since it is not stressed by tensile forces. The half designated 65 carries a part 21 of the velcro fastener, the other part 20 is fastened to a cloth 66. The velcro fastener 20, 21 serves for the matching to the current situation of the wearer and is adjusted before entering the aircraft. To put on the protective suit all the zip fasteners are open; then the zip fastener 12 is closed; the wearer can move freely. A further zip fastener, whose halves are designated 61a, 61b, bridges the insert. Mobility is thereby somewhat restricted, but climbing into the aircraft is however possible without difficulty, thanks to the elastic inserts 52. Then a further, third zip fastener 62a, 62b is closed. A last, fourth zip fastener 63a, b bridges a second smaller insert 19a. The arm tubes have this construction, as do the leg tubes similarly; the zip fasteners 61a, b, 62a, b, 63a, b in the leg tubes however extend from the ankle up to the neck opening, as shown in FIG. 12 using the zip fastener 44. With the closing of the fourth zip fastener 63a, b the wearer is both fixed in the sitting position, and a basic pressure corresponding to straight flight is built up in the protective suit, such that fluid building up the equalising pressure and the equalising tension in the hollow spaces 5 is distributed over the entire body length covered by the protective suit. An opening 46 in the groin of the protective suit can be provided for the genitalia, this can also be closed by an elastic textile material.

Flight trials have resulted in no harmful effects on health due to the opening 46. On the other hand it improves the mobility of the wearer of the protective suit.

A modification of the solution according to FIG. 14 is shown in FIG. 15. Here the fourth zip fastener 63a, b as well as the small insert 19a are omitted. In their place comes a tensioning element, schematically represented as a hollow space analog to the bands 38 to 41. This tensioning element 26 extends over the whole length of the closure shown in cross section in FIG. 15, but can also be divided into several pieces, closed off in themselves.

Following the closure of the zip fasteners 61a, b; 62a, b; and the velcro fasteners 20, 21, the tensioning element 26 is for instance inflated by compressed air, whose pressure is higher than that in the deepest positioned hollow spaces 5 at the greatest possible curved flight acceleration.

By the formation of the width of the tensioning element 26 the basic tension σ can be exactly adjusted to the required necessary value.

FIG. 16 shows again a half of the illustration on the left-hand side and a similar one on the right, each with a modification of the rear side of the protective suit. The concepts "left" and "right" are exchanged with respect to FIG. 14. The two modifications comprise again the insertion of a zig-zag shaped band 38 on the left and an extended band 40 on the right; both bands extend from the shoulder part down to the foot of the wearer. Obviously in an especial form of construction the left and right sides of the front and back parts are produced in the same way, on the other hand the front side can have a different pattern of hollow spaces 5 than the back part.

In the region of the knees both bands 38, 40 are made narrower. Thereby no unduly high tension arises over the knee. Furthermore space is found thereby for the elastic insert 52.

FIG. 16 shows the back view of the example of construction according to FIG. 12, again in two modifications of construction as regards the bands 38, 40. It is similarly in accordance with the invention, for the bands 38, 40 to be varied in their width in order to build up the correct tension.

In the region of the elbows the example in FIG. 16 carries elastic inserts 52.

An extension according to the invention is a fluid-filled insert 67a, b in accordance with FIG. 17. This is worn under the protective suit and is here—as drawn—divided into two halves 67a, b, which however can be connected to each other. Each insert 67a, b is connected to a reservoir 68a, b extending upwards; the two reservoirs 68a, b are however outside the layers 3, 4 comprising the protective suit, nevertheless advantageously worn under the oversuit 2. Thereby only the inserts 67a, b are subject to the ruling tension in the layers 3, 4 and the main part 37. The object of the inserts 67a, b is the production of an equalising pressure on the belly/abdominal region. According to the anatomical characteristics of the wearer the protective suit runs relatively flat between the two intestines. This means that the belly volume can increase relatively strongly, before the internal pressure in the suit is compensated. The consequences of this can on the one hand be an undesirable collection of blood in the abdominal cavity, and on the other a load on the diaphram. The latter makes belly breathing difficult up to the disability to breathe out, which is caused by a loss of tension leading to upwards bulging in the diaphram.

In G loading of the wearer fluid flows out of the reservoir 68a, b into the inserts 67a, b until the internal pressure of the belly space corresponds to the compensatory pressure built up in the inserts 67a, b and the reservoir 68a, b. The reservoirs 68a, b can be fastened to the protective suit or possibly be carried on a band around the neck. Furthermore it lies within the idea of this extension, that the two inserts 67a, b can be unified into a single volume.

FIG. 18 is the representation of a second example of construction of a pressure loaded belly bladder in analogy to the fluid filled insert 67a, b of FIG. 17. An anatomically shaped bladder 71 of an elastomer is the medium pressure reservoir of an automatic lung, similar to that known from the sport of diving. The bladder is fed via a pressure actuated regulating valve 72 from the on-board high pressure reservoir 73 for breathing air, shown here schematically as a pressure bottle. The regulating valve 72 decreases the pressure of the breathing gas from the high pressure reservoir 73 to a pressure which is a little above the pressure in the lungs. It is controlled via a pressure line 74, which communicates with one of the bands 38, 40. The pressure line 74 opens into the abdominal region at a transfer position 75 in one of the bands 38, 40 and assumes the ruling hydrostatic pressure at the transfer position 75 as the control value. There are two modifications to this: either the regulating valve lies at the same hydrostatic pressure as the transfer position 75 mentioned, then the pressure line 74 can be filled with fluid. Or the pressure line 74 carries air—or generally: a gas—then the hydrostatic pressure at the transfer position controls a pressure reducing valve (not shown) and with it feeds the pressure line 74 with the pressure originating from the high pressure reservoir 73 and at reduced pressure.

The bladder 71, worn under the protective suit, is on the one hand actuated by its tension σ and by the high pressure, reduced by the regulating valve 72 to medium pressure $p_m$. Because of the type of the mechanical definition of $p_m$ this corresponds to the hydrostatic pressure in the abdominal region, so that the belly organs are freed from loading and the diaphram is freed from its momentary weight increase. The exact value of $p_m$ is adjustable by the regulating valve 72 for individual cases.

A second regulating valve 76, similarly known from the lung automats in sport diving, which responds to breathing activity, is connected to the bladder 71. Thereby the breath pressure Pa lies only a little below the medium pressure Pm. The regulating valve 76 feeds the breathing tube designated 77 and a breathing mask 78.

On breathing in the bladder 71 partly empties by a volume, which is smaller than the volume of the breath. In order to make these volumes the same, the second regulating valve 76 can have an overflow device, which blows off a predetermined adjustable portion of the breathing air directly via the regulating valve to the outside.

In the flying helmet (not shown) or separated from it, the pilot carries a shell-shaped headphone harness 80, which lies tightly against the head. From this to the breathing mask 78 leads on each side a connecting tube 79. With this it can be ascertained that both sides of the eardrum are under the same pressure—the breathing pressure. The breathing mask 78 and the earphones 80 are anyway part of the pilot's equipment; the only additions are the two connecting tubes 79.

FIG. 19 shows a flying boot 48 in side view, partly cut away. Between the foot of the wearer—provided with the reference number 49—and a normal tongue 50 fastened to the boot 48, a double-walled, second tongue, again composed of layers 3, 4, is inserted, which has a fluid filled hollow space 5. The second tongue 51 is, with reference to all the previously described examples of construction of the protective suit, provided as a continuation of the leg part; the hollow space 5 communicates with that of the leg part.

When the aircraft engine is running, even on the ground, the adjustment and maintenance of a comfortable temperature in the cockpit is generally no problem. In the preparation phase, when the pilot is already sitting in the cockpit, but the engine is still stationary, it can be either very hot or uncomfortably cold according to the situation. Naturally this is also the case if the air conditioning in the cockpit is insufficient or fails. A device, which is a component of the protective suit, is shown schematically in FIG. 20. It shows a part of the lining 1. This comprises for instance two layers of a weft, joined by means of a known bonding technique for textiles. Between the layers, of which the inner layer is referenced 48, there is an arrangement of Peltier effect elements 49. These are all connected electrically conducting to a conductor 50, of which one pole leads to a d.c. voltage—or to a conductor connected to it—, as also to a conductor 51 leading to the other pole or to one connected to it. The conductors 50, 51 are taken together into a connector socket 52, which is taken through the outer layer (not shown) of the lining I and corresponds to a suitable mating part (not shown) in the active part of the protective suit and the oversuit 2.

In accordance with the adjusted polarity of the d.c. voltage—and therewith the direction of current flow of the direct current passing through the Peltier elements 49—the heat energy flow changes direction from or to the Peltier elements 49. With the same device it is possible thus to heat or to cool. The high temperature reservoir in the heating setting, the low temperature reservoir in the cooling setting of the device according to FIG. 20 are located on the aircraft side.

The conductors 50, 51 are made highly flexible and insulated. The connection to the Peltier elements 49 is performed by a well known solder-free connecting technique. Semiconductor Peltier elements with high thermal efficiency are available. The arrangement of Peltier elements 49 is shown schematically in FIG. 20, for the front side of the upper body. Obviously it is possible to carry this out in the same or a suitable manner for the back area and the extremities. By the use of diodes it is possible to set up certain areas of the arrangement of Peltier elements 49 only for heating or only for cooling. Such diodes 53 are drawn in in FIG. 20 for the abdominal region as representative.

Furthermore, the Peltier elements can be arranged in several independent circuits, whereby the possibility arises of heating or cooling certain parts of the body selectively. The connector socket has then the corresponding number of connections.

What is claimed is:

1. A suit for protection of a wearer against acceleration forces comprising:
   an active part that includes at least one double-walled portion filled with a fluid, which, in response to accelerations ≠1 g in a momentary and local z-axis, builds up a compensating outer force corresponding to an internal force on the wearer, the suit comprising at least in part an inner layer and an outer layer of a fluid-tight and low stretch textile material, the layers being joined together at connection positions such that hollow spaces arise between the connection positions, wherein the hollow spaces form a continuous hydrostatic pressure column from ankles up to a neck of the wearer, the inner layer exerting a pressure on the body of the wearer corresponding to a height of a fluid column and an effective acceleration in the momentary and local z-axis, a tensile force being built up in the outer layer in response to the pressure, wherein the connection positions are adapted to be joined to single layer connecting pieces, the single layer connection pieces comprising low stretch textile material outside the hollow spaces, which are adapted to transmit the tensile force built up onto the surface of the body of the wearer of the suit, the connection positions being arranged such that shortening of separation of neighboring connection positions in response to the pressure of the fluid present in the hollow spaces causes a build up of an intended tensile force in direction and magnitude and transmission of the intended tensile force to neighboring elements, wherein the active part of the suit includes means for matching the suit to current bodily conditions of the wearer and means for closure that are simultaneously suited for building up a necessary basic pressure of the suit for straight flight.

2. A suit according to claim 1, wherein the suit covers essentially a whole body of the wearer except the neck, head, hands and feet.

3. A suit according to claim 2, wherein the means for matching the suit to the current bodily conditions of the wearer comprise straps and buckles that are arranged over the whole length of the suit.

4. A suit according to claim 3, further comprising an insert along the means of closure, wherein the means of closure is arranged such that the insert is bridged over in the closure so that tension in the suit runs via the means of closure, and the insert is fully unloaded thereby.

5. A suit according to claim 2, wherein the means for matching the suit to the current bodily conditions of the wearer comprises hook-and-loop fasteners that extend over an entire length of a part of the suit to be closed.

6. A suit according to claim 5, further comprising an insert along the means of closure, wherein the means of closure is arranged such that the insert is bridged over in the closure so that tension in the suit runs via the means of closure, and the insert is fully unloaded thereby.

7. A suit according to claim 5, further comprising:

an insert along the means of closure, wherein the means of closure is arranged such that the insert is bridged over in the closure so that tension in the suit runs via the means of closure and the insert is fully unloaded thereby; and a first zip fastener that closes the insert, wherein the hook-and-loop fastener is arranged so that a fixed part of the fastener lies against the body of the wearer and a movable part of the fastener is fixed to an end of the insert such that when the hook-and-loop fastener is closed, the hook-and-loop fastener bridges the insert and the zip fastener.

8. A suit according to claim 5, further comprising:

a first insert along the means of closure, wherein the means of closure is arranged such that the insert is bridged over in the closure so that tension in the suit runs via the means of closure and the insert is fully unloaded by thereby;

a first zip fastener that closes a part of the suit to be closed;

a second zip fastener that bridges the insert;

a third zip fastener, wherein a first portion of the third zip fastener is fastened to the part of the suit to be closed and a second portion of the third zip fastener is fastened to an end of a cloth that extends over the whole length of the suit;

a second insert, wherein the second insert extends over the whole length the cloth; and a fourth zip fastener that bridges the second insert and with which a necessary basic tension is provided, wherein the hook-and-loop fastener joins the cloth to the part of the suit to be closed.

9. A suit according to claim 5, wherein the hook-and-loop fasteners comprise a multiplicity of straps.

10. A suit according to claim 9, further comprising an insert along the means of closure, wherein the means of closure is arranged such that the insert is bridged over in the closure so that tension in the suit runs via the means of closure, and the insert is fully unloaded thereby.

11. A suit according to claim 9, further comprising:

an insert along the means of closure, wherein the means of closure is arranged such that the insert is bridged over in the closure so that tension in the suit runs via the means of closure and the insert is fully unloaded thereby; and a first zip fastener that closes the insert, wherein the hook-and-loop fastener is arranged so that a fixed part of the fastener lies against the body of the wearer and a movable part of the fastener is fixed to an end of the insert such that when the hook-and-loop fastener is closed, the hook-and-loop fastener bridges the insert and the zip fastener.

12. A suit according to claim 9, further comprising:

a first insert along the means of closure, wherein the means of closure is arranged such that the insert is bridged over in the closure so that tension in the suit runs via the means of closure and the insert is fully unloaded by thereby;

a first zip fastener that closes a part of the suit to be closed;

a second zip fastener that bridges the insert;

a third zip fastener, wherein a first portion of the third zip fastener is fastened to the part of the suit to be closed and a second portion of the third zip fastener is fastened to an end of a cloth that extends over the whole length of the suit;

a second insert, wherein the second insert extends over the whole length the cloth; and a fourth zip fastener that bridges the second insert and with which a necessary basic tension is provided, wherein the hook-and-loop fastener joins the cloth to the part of the suit to be closed.

13. A suit according to claim 2, wherein the means for closing comprises zip fasteners.

14. A suit according to claim 13, further comprising:

an insert along the means of closure, wherein the means of closure is arranged such that the insert is bridged over in the closure so that tension in the suit runs via the means of closure and the insert is fully unloaded thereby; and a first zip fastener that closes the insert, wherein the hook-and-loop fastener is arranged so that a fixed part of the fastener lies against the body of the wearer and a movable part of the fastener is fixed to an end of the insert such that when the hook-and-loop fastener is closed, the hook-and-loop fastener bridges the insert and the zip fastener.

15. A suit according to claim 13, further comprising:

a first insert along the means of closure, wherein the means of closure is arranged such that the insert is bridged over in the closure so that tension in the suit runs via the means of closure and the insert is fully unloaded by thereby;

a first zip fastener that closes a part of the suit to be closed;

a second zip fastener that bridges the insert;

a third zip fastener, wherein a first portion of the third zip fastener is fastened to the part of the suit to be closed and a second portion of the third zip fastener is fastened to an end of a cloth that extends over the whole length of the suit;

a second insert, wherein the second insert extends over the whole length the cloth; and a fourth zip fastener that bridges the second insert and with which a necessary basic tension is provided, wherein the hook-and-loop fastener joins the cloth to the part of the suit to be closed.

16. A suit according to claim 13, wherein the means of matching the suit to the current bodily conditions of the wearer comprises pneumatic tensioning elements, wherein the pneumatic tensioning elements:

extend over the whole length of and are arranged parallel to the zip fasteners;

include a low-stretch and airtight textile material and have connection positions along their length; and are adapted to build up the basic tension $\sigma$ of the suit due to a fluid under pressure.

17. A suit according to claim 16, further comprising:

an insert along the means of closure, wherein the means of closure is arranged such that the insert is bridged over in the closure so that tension in the suit runs via the means of closure and the insert is fully unloaded thereby; and a first zip fastener that closes the insert, wherein the hook-and-loop fastener is arranged so that a fixed part of the fastener lies against the body of the wearer and a movable part of the fastener is fixed to an end of the insert such that when the hook-and-loop fastener is closed, the hook-and-loop fastener bridges the insert and the zip fastener.

18. A suit according to claim 16, further comprising:
a first insert along the means of closure, wherein the means of closure is arranged such that the insert is bridged over in the closure so that tension in the suit runs via the means of closure and the insert is fully unloaded by thereby;
a first zip fastener that closes a part of the suit to be closed;
a second zip fastener that bridges the insert;
a third zip fastener, wherein a first portion of the third zip fastener is fastened to the part of the suit to be closed and a second portion of the third zip fastener is fastened to an end of a cloth that extends over the whole length of the suit;
a second insert, wherein the second insert extends over the whole length the cloth; and
a fourth zip fastener that bridges the second insert and with which a necessary basic tension is provided, wherein the hook-and-loop fastener joins the cloth to the part of the suit to be closed.

19. A suit according to claim 2, further comprising a lining and an oversuit, wherein the lining is worn under and the oversuit is worn over the active part of the suit.

20. A suit according to claim 19, wherein the lining and the oversuit are partly joined to the active part of the suit.

21. A suit according to claim 2, wherein the hollow spaces and the connection positions extend completely over the suit except for locations of means of matching and closing the suit.

22. A suit according to claim 21, wherein individual connection positions are arranged essentially on parallel lines and a separation of connection positions lying on an individual line corresponds essentially to a lateral separation of the connection positions, wherein the arrangement of connection positions is adapted to be applied where tensional forces mainly perpendicular to a direction of the connection positions are to be generated.

23. A suit according to claim 21, wherein the connection positions are arranged in straight lines that run essentially parallelly to each other and whose lengths correspond to their lateral separation, wherein individual connection positions lie essentially on at least one group of two parallel lines, the two parallel lines being displaced from each other by about half a lateral separation of two adjacent connection positions, and wherein the connection positions lying on the displaced parallel lines lie essentially symmetrically to gaps of connection positions on non-displaced parallel lines, the arrangement of connection positions being adapted to be applied where tensional forces mainly perpendicular to a direction of the connection positions and in a small measure also in a direction of the connection positions are to be generated.

24. A suit according to claim 21, wherein the individual connection positions are arranged in straight lines essentially radial to a point, wherein the arrangement of connection positions is adapted to be applied both to where tensional forces are to be built up on circulating lines as well as to where a basket-shaped deformation of mutually connected layers is to be effected.

25. A suit according to claim 2, wherein the hollow spaces and the connection positions are arranged in bands that extend over a whole length of the suit.

26. A suit according to claim 25, wherein individual connection positions are arranged essentially on parallel lines and a separation of connection positions lying on an individual line corresponds essentially to a lateral separation of the connection positions, wherein the arrangement of connection positions is adapted to be applied where tensional forces mainly perpendicular to the direction of the connection positions are to be generated.

27. A suit according to claim 25, wherein the connection positions are arranged in straight lines that run essentially parallelly to each other and whose lengths correspond to their lateral separation, wherein individual connection positions lie essentially on at least one group of two parallel lines, the two parallel lines being displaced from each other by about half a lateral separation of two adjacent connection positions, and wherein the connection positions lying on the displaced parallel lines lie essentially symmetrically to gaps of connection positions on non-displaced parallel lines, the arrangement of connection positions being adapted to be applied where tensional forces mainly perpendicular to a direction of the connection positions and in a small measure also in a direction of the connection positions are to be generated.

28. A suit according to claim 25, wherein the individual connection positions are arranged in straight lines essentially radial to a point, wherein the arrangement of connection positions is adapted to be applied both to where tensional forces are to be built up on circulating lines as well as to where a basket-shaped deformation of mutually connected layers is to be effected.

29. A suit according to claim 25, wherein the bands extending over the whole length of the suit are formed in a wave shape, the individual connection positions lie essentially on parallel lines, and a separation of connection positions lying on an individual line corresponds essentially to a lateral separation of the connection positions, wherein the arrangement of connection positions is adapted to be applied where tensional forces mainly perpendicular to a direction of the connection positions are to be generated.

30. A suit according to claim 25, wherein the bands extending over the whole length of the suit are formed in a wave shape.

31. A suit according to claim 25, wherein the bands extending over the whole length of the suit are formed essentially in an elongated shape, individual connection positions are arranged essentially on parallel lines, and a separation of connection positions lying on an individual line corresponds essentially to a lateral separation of the connection positions, wherein the arrangement of connection positions is adapted to be applied where tensional forces mainly perpendicular to a direction of the connection positions are to be generated.

32. A suit according to claim 25, wherein the bands extending over the whole length of the suit are formed essentially in an elongated shape, the connection positions are arranged in straight lines that run essentially parallel to each other and whose lengths correspond to a lateral separation of the connection positions, wherein individual connection positions lie essentially on at least one group of two parallel lines that are displaced from each other by about half of a lateral separation of two adjacent connection positions and connection positions lying on displaced parallel lines lie essentially symmetrically to gaps of the connection positions on non-displaced parallel lines, and wherein the arrangement of connection positions is adapted to be applied where tensional forces mainly perpendicular to a direction of the connection positions and in a small measure also in a direction of the connection positions are to be generated.

33. A suit according to claim 1, further comprising a lining and an oversuit, wherein the lining is worn under and the oversuit is worn over the active part of the suit.

34. A suit according to claim 33, wherein the lining and the oversuit are partly joined to the active part of the suit.

35. A suit according to claim 1, wherein the means for matching the suit to the current bodily conditions of the wearer comprises hook-and-loop fasteners that extend over an entire length of a part of the suit to be closed.

36. A suit according to claim 35, further comprising an insert along the means of closure, wherein the means of closure is arranged such that the insert is bridged over in the closure so that tension in the suit runs via the means of closure, and the insert is fully unloaded thereby.

37. A suit according to claim 35, further comprising:
an insert along the means of closure, wherein the means of closure is arranged such that the insert is bridged over in the closure so that tension in the suit runs via the means of closure and the insert is fully unloaded thereby; and
a first zip fastener that closes the insert, wherein the hook-and-loop fastener is arranged so that a fixed part of the fastener lies against the body of the wearer and a movable part of the fastener is fixed to an end of the insert such that when the hook-and-loop fastener is closed, the hook-and-loop fastener bridges the insert and the zip fastener.

38. A suit according to claim 35, further comprising:
a first insert along the means of closure, wherein the means of closure is arranged such that the insert is bridged over in the closure so that tension in the suit runs via the means of closure and the insert is fully unloaded by thereby;
a first zip fastener that closes a part of the suit to be closed;
a second zip fastener that bridges the insert;
a third zip fastener, wherein a first portion of the third zip fastener is fastened to the part of the suit to be closed and a second portion of the third zip fastener is fastened to an end of a cloth that extends over the whole length of the suit;
a second insert, wherein the second insert extends over the whole length the cloth; and
a fourth zip fastener that bridges the second insert and with which a necessary basic tension is provided, wherein the hook-and-loop fastener joins the cloth to the part of the suit to be closed.

39. A suit according to claim 35, wherein the hook-and-loop fasteners comprise a multiplicity of straps.

40. A suit according to claim 39, further comprising an insert along the means of closure, wherein the means of closure is arranged such that the insert is bridged over in the closure so that tension in the suit runs via the means of closure, and the insert is fully unloaded thereby.

41. A suit according to claim 39, further comprising:
an insert along the means of closure, wherein the means of closure is arranged such that the insert is bridged over in the closure so that tension in the suit runs via the means of closure and the insert is fully unloaded thereby; and
a first zip fastener that closes the insert, wherein the hook-and-loop fastener is arranged so that a fixed part of the fastener lies against the body of the wearer and a movable part of the fastener is fixed to an end of the insert such that when the hook-and-loop fastener is closed, the hook-and-loop fastener bridges the insert and the zip fastener.

42. A suit according to claim 39, further comprising:
a first insert along the means of closure, wherein the means of closure is arranged such that the insert is bridged over in the closure so that tension in the suit runs via the means of closure and the insert is fully unloaded by thereby;
a first zip fastener that closes a part of the suit to be closed;
a second zip fastener that bridges the insert;
a third zip fastener, wherein a first portion of the third zip fastener is fastened to the part of the suit to be closed and a second portion of the third zip fastener is fastened to an end of a cloth that extends over the whole length of the suit;
a second insert, wherein the second insert extends over the whole length the cloth; and
a fourth zip fastener that bridges the second insert and with which a necessary basic tension is provided, wherein the hook-and-loop fastener joins the cloth to the part of the suit to be closed.

43. A suit according to claim 1, wherein the means for closing comprises zip fasteners.

44. A suit according to claim 43, further comprising:
an insert along the means of closure, wherein the means of closure is arranged such that the insert is bridged over in the closure so that tension in the suit runs via the means of closure and the insert is fully unloaded thereby; and
a first zip fastener that closes the insert, wherein the hook-and-loop fastener is arranged so that a fixed part of the fastener lies against the body of the wearer and a movable part of the fastener is fixed to an end of the insert such that when the hook-and-loop fastener is closed, the hook-and-loop fastener bridges the insert and the zip fastener.

45. A suit according to claim 43, further comprising:
a first insert along the means of closure, wherein the means of closure is arranged such that the insert is bridged over in the closure so that tension in the suit runs via the means of closure and the insert is fully unloaded by thereby;
a first zip fastener that closes a part of the suit to be closed;
a second zip fastener that bridges the insert;
a third zip fastener, wherein a first portion of the third zip fastener is fastened to the part of the suit to be closed and a second portion of the third zip fastener is fastened to an end of a cloth that extends over the whole length of the suit;
a second insert, wherein the second insert extends over the whole length the cloth; and
a fourth zip fastener that bridges the second insert and with which a necessary basic tension is provided, wherein the hook-and-loop fastener joins the cloth to the part of the suit to be closed.

46. A suit according to claim 43, wherein the means of matching the suit to the current bodily conditions of its wearer comprises pneumatic tensioning elements, wherein the pneumatic tensioning elements:
extend over the whole length of and are arranged parallel to the zip fasteners;
include a low-stretch and airtight textile material;
have connection positions along their length; and
are adapted to build up a basic tension $\sigma$ of the suit in response to a fluid under pressure.

47. A suit according to claim 46, further comprising:
an insert along the means of closure, wherein the means of closure is arranged such that the insert is bridged over in the closure so that tension in the suit runs via the means of closure and the insert is fully unloaded thereby; and a first zip fastener that closes the insert, wherein the hook-and-loop fastener is arranged so that a fixed part of the fastener lies against the body of the wearer and a movable part of the fastener is fixed to an end of the insert such that when the hook-and-loop fastener is closed, the hook-and-loop fastener bridges the insert and the zip fastener.

48. A suit according to claim 41, further comprising:

a first insert along the means of closure, wherein the means of closure is arranged such that the insert is bridged over in the closure so that tension in the suit runs via the means of closure and the insert is fully unloaded by thereby;

a first zip fastener that closes a part of the suit to be closed;

a second zip fastener that bridges the insert;

a third zip fastener, wherein a first portion of the third zip fastener is fastened to the part of the suit to be closed and a second portion of the third zip fastener is fastened to an end of a cloth that extends over the whole length of the suit;

a second insert, wherein the second insert extends over the whole length the cloth; and a fourth zip fastener that bridges the second insert and with which a necessary basic tension is provided, wherein the hook-and-loop fastener joins the cloth to the part of the suit to be closed.

49. A suit according to claims 16 or 46, further comprising:

a first insert along the means of closure, wherein the means of closure is arranged such that the insert is bridged over in the closure so that tension in the suit runs via the means of closure and the insert is fully unloaded thereby;

a first zip fastener that closes a part of the suit to be closed;

a second zip fastener that bridges the insert; and a third zip fastener, wherein a first portion of the third zip fastener is fastened to the part of the suit to be closed and a second portion of the third zip fastener is fastened to an end of a cloth that extends over the whole length of the part of the suit to be closed, wherein the pneumatic element is inserted in the cloth and the hook-and-loop fastener joins the cloth with the part of the suit to be closed.

50. A suit according to claims 21 or 25, wherein the layers are formed in height as enclosed regions, each of the enclosed regions having at least one valve for filling and ventilation, wherein the enclosed regions are arranged to overlap in the suit so that hydrostatic pressure in an outer region is transmitted to an outer part of an inner region.

51. A suit according as in claims 1, 2, 19, 20, 33, or 34, further comprising:

a fluid-filled insert arranged inside the suit in a belly/abdominal region and joined externally to the suit; and an upwardly-extending reservoir connected to the insert, arranged outside and joined to the suit, and filled with fluid, whereby, in response to an increase in loading due to acceleration, the fluid flows back from the reservoir into the fluid-filled insert and increases pressure on the belly/abdominal region.

52. A suit according to claim 1, further comprising:

an anatomically-shaped bladder comprising an elastomer, an entrance, and an exit, each of the entrance and the exit opening outside the suit, wherein the entrance and the exit are adapted to be closed, respectively, by a first and a second regulating valve, wherein the first regulating valve is adapted to reduce pressure of breathing air from a high pressure to a medium pressure, the anatomically-shaped bladder being arranged inside the suit in a belly/abdominal region and adapted to be joined externally to the suit;

a pressure line connected to a predetermined position in the hollow space of the suit and to the regulating valve, wherein a control value that is a ruling hydrostatic pressure at the predetermined position in the hollow space of the suit is transmitted to the first regulating valve via the pressure line; and a breathing mask worn by the wearer comprising a breathing tube, wherein an outlet of the second regulating valve opens into the breathing tube, the second regulating valve being adapted to reduce the medium pressure to a breathing pressure.

53. A suit according to claim 52, further comprising an over flow device positioned at a suitable position between and connected to both the second regulating valve and the breathing mask.

54. A suit according to claim 52, further comprising an earphone harness having connecting tubes worn by the wearer of the suit, the earphone harness being connected via the connecting tubes to a position carrying the breathing pressure such that a same effective pressure on an outer side as on an inner side of an eardrum is achieved.

55. A suit according to claim 1 or 2, wherein the connection positions are formed by gluing.

56. A suit according to claim 1 or 2, wherein the connection positions are formed by welding.

57. A suit according to claim 1 or 2, wherein the connection positions are formed by sewing and sealing.

58. A suit as in one of claims 22–32, wherein the bands are branched.

59. A suit according to claim 21 or 25, wherein at creasing positions of the active part of the suit soft bending and kink-resisting elements are inserted in the hollow spaces.

* * * * *

UNITED STATES PATENT AND TRADEMARK OFFICE
CERTIFICATE OF CORRECTION

PATENT NO. : 6,419,622 B1
DATED : July 16, 2002
INVENTOR(S) : Andreas Reinhard

It is certified that error appears in the above-identified patent and that said Letters Patent is hereby corrected as shown below:

Title page, Item [54] and Column 1, line 1,
Title of Invention, replace "ACCELERATION PROTECTIVE SUIT" with
-- ACCELERATION PROTECTION SUIT --

Title page,
Item [56], FOREIGN PATENT DOCUMENTS, insert
-- FR        2,581,964      5/1985
   EP        0,348,835      1/1990
   WO        99/54203       10/1999
   WO        99/54201       10/1999
   WO        99/54202       10/1999 --

Column 9,
Line 11, replace "pressure Pa" with -- pressure $p_a$ --
Line 11, replace "pressure Pm" with -- pressure $P_m$ --
Line 56, replace "lining I" with -- lining 1 --

Signed and Sealed this

Thirteenth Day of May, 2003

JAMES E. ROGAN
*Director of the United States Patent and Trademark Office*